US012644785B2

(12) United States Patent
Hishinuma et al.

(10) Patent No.: US 12,644,785 B2
(45) Date of Patent: Jun. 2, 2026

(54) STRETCHABLE DEVICE

(71) Applicant: Magnolia White Corporation, Tokyo (JP)

(72) Inventors: Masatomo Hishinuma, Tokyo (JP); Takumi Sano, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 320 days.

(21) Appl. No.: 18/423,785

(22) Filed: Jan. 26, 2024

(65) Prior Publication Data

US 2024/0255366 A1 Aug. 1, 2024

(30) Foreign Application Priority Data

Jan. 31, 2023 (JP) ................................. 2023-012881

(51) Int. Cl.
*G01L 1/22* (2006.01)

(52) U.S. Cl.
CPC ............ *G01L 1/2206* (2013.01); *G01L 1/225* (2013.01); *G01L 1/2287* (2013.01)

(58) Field of Classification Search
CPC ..... G01L 1/2206; G01L 1/225; G01L 1/2287; G01L 1/2262
See application file for complete search history.

(56) References Cited

U.S. PATENT DOCUMENTS

| | | | | |
|---|---|---|---|---|
| 2,666,262 | A * | 1/1954 | Ruge ..................... | G01L 1/2206 73/862.632 |
| 5,640,178 | A * | 6/1997 | Endo ..................... | G06F 3/0338 345/161 |
| 7,315,666 | B2 * | 1/2008 | Van Der Spek ........ | E21B 47/01 385/12 |
| 8,895,864 | B2 * | 11/2014 | Cotton ................. | H05K 1/0283 174/254 |
| 9,841,548 | B2 * | 12/2017 | Kim ..................... | G06F 1/1643 |
| 11,388,816 | B2 * | 7/2022 | Sano ..................... | H05K 1/189 |
| 11,930,591 | B2 * | 3/2024 | Sano ..................... | H05K 1/0283 |
| 2010/0000327 | A1 * | 1/2010 | Morimoto .............. | G01L 5/162 73/760 |
| 2011/0226069 | A1 * | 9/2011 | Kim ..................... | G01L 1/2293 29/25.01 |

(Continued)

FOREIGN PATENT DOCUMENTS

JP 2021-118273 A 8/2021

*Primary Examiner* — David J Bolduc
(74) *Attorney, Agent, or Firm* — K&L Gates LLP

(57) ABSTRACT

A stretchable device includes strain gauges and electrical wiring. Each strain gauge includes a first strain gauge and a second strain gauge. The first strain gauge and the second strain gauge are coupled to each other. The electrical wiring includes a first potential line, a second potential line, a coupling line coupling the first potential line to the second potential line, a first signal line, and a second signal line. The first signal line detects a third potential at a first coupling point. The second signal line detects a fourth potential at a midpoint of the coupling line. One of the first strain gauge and the second strain gauge is an inner peripheral strain gauge. The other thereof is an outer peripheral strain gauge. The amount of change in resistance of each strain gauge is detected based on a potential difference between the third potential and the fourth potential.

4 Claims, 13 Drawing Sheets

(56) References Cited

U.S. PATENT DOCUMENTS

| | | | |
|---|---|---|---|
| 2015/0355042 A1* | 12/2015 | Kodama | G01L 1/22 |
| | | | 73/862.045 |
| 2018/0178879 A1* | 6/2018 | Mioka | B62J 99/00 |
| 2019/0113407 A1* | 4/2019 | Okada | G01L 5/166 |
| 2021/0234108 A1 | 7/2021 | Sano | |
| 2021/0389194 A1* | 12/2021 | Bittner | G01L 1/26 |
| 2022/0003577 A1* | 1/2022 | Evke | G01L 1/22 |
| 2023/0316974 A1* | 10/2023 | Kim | G09G 3/035 |
| | | | 345/619 |
| 2023/0384832 A1* | 11/2023 | Koo | H05K 1/0283 |
| 2024/0114616 A1* | 4/2024 | Hyodo | H05K 1/0283 |
| 2024/0121892 A1* | 4/2024 | Sano | H05K 1/0283 |
| 2024/0121893 A1* | 4/2024 | Sano | H05K 1/0283 |

* cited by examiner

STRETCHABLE DEVICE

CROSS-REFERENCE TO RELATED APPLICATION

This application claims the benefit of priority from Japanese Patent Application No. 2023-012881 filed on Jan. 31, 2023, the entire contents of which are incorporated herein by reference.

BACKGROUND

1. Technical Field

What is disclosed herein relates to a stretchable device.

2. Description of the Related Art

Stretchable devices have excellent elasticity and flexibility. Such stretchable devices include a resin base member on which a wiring layer is stacked. The resin base member includes bodies arrayed in a matrix (row-column configuration) and hinges that couple the bodies to each other. The hinge described in Japanese Patent Application Laid-open Publication No. 2021-118273 includes a plurality of arcs and has a meandering shape. When a tensile load acts on the stretchable device, the arcs of the hinge deform to expand. As a result, the bodies are separated from each other, and the stretchable device extends.

To detect the load acting on a stretchable device, it has recently been considered to provide strain gauges to the hinges and detect the amount of strain (amount of deformation) of the hinges. It is desired that the sensitivity to detect the amount of strain be high.

SUMMARY

According to an aspect, a stretchable device includes: a resin base member; a plurality of strain gauges disposed on the resin base member; electrical wiring configured to detect an amount of change in resistance of each of the strain gauges; and a housing that accommodates the resin base member, the strain gauges, and the electrical wiring. The housing includes a detection region configured to detect an applied load and a peripheral region having a frame-like shape and surrounding the detection region, when viewed in a direction orthogonal to a planar direction in which the resin base member extends. The resin base member includes: a plurality of bodies disposed in the detection region and separated from one another; and a plurality of hinges disposed in the detection region and coupling the bodies while meandering. The strain gauges each include: a first strain gauge extending from a first end of the hinge to a second end of the hinge; and a second strain gauge extending from the second end of the hinge to the first end of the hinge. A first end of the first strain gauge and a first end of the second strain gauge are coupled to each other at the second end of the hinge. The electrical wiring includes: a first potential line disposed over the peripheral region, the bodies, and the hinges and configured to apply a first potential to a second end of the first strain gauge; a second potential line disposed over the peripheral region, the bodies, and the hinges and configured to apply a second potential lower than the first potential to a second end of the second strain gauge; a coupling line disposed in the peripheral region and coupling the first potential line to the second potential line; a first signal line disposed over the peripheral region, the bodies, and the hinges and configured to detect a predetermined potential; and a second signal line disposed in the peripheral region and configured to detect a predetermined potential. The predetermined potential detected by the first signal line is a third potential at a first coupling point at which the first end of the first strain gauge and the first end of the second strain gauge are coupled. The predetermined potential detected by the second signal line is a fourth potential at a midpoint of the coupling line. One of the first strain gauge and the second strain gauge is an inner peripheral strain gauge disposed on an inner periphery of the hinge. The other one of the first strain gauge and the second strain gauge is an outer peripheral strain gauge disposed on an outer periphery of the hinge. The amount of change in resistance of each strain gauge is detected based on a potential difference between the third potential detected from the first signal line and the fourth potential detected from the second signal line.

BRIEF DESCRIPTION OF THE DRAWINGS

FIG. 2 is a schematic of a section of the stretchable device according to the embodiment, and more specifically a sectional view along line II-II of FIG. 3;

FIG. 8 is a plan view of the bodies and a lateral hinge according to the embodiment;

DETAILED DESCRIPTION

Figure 1:
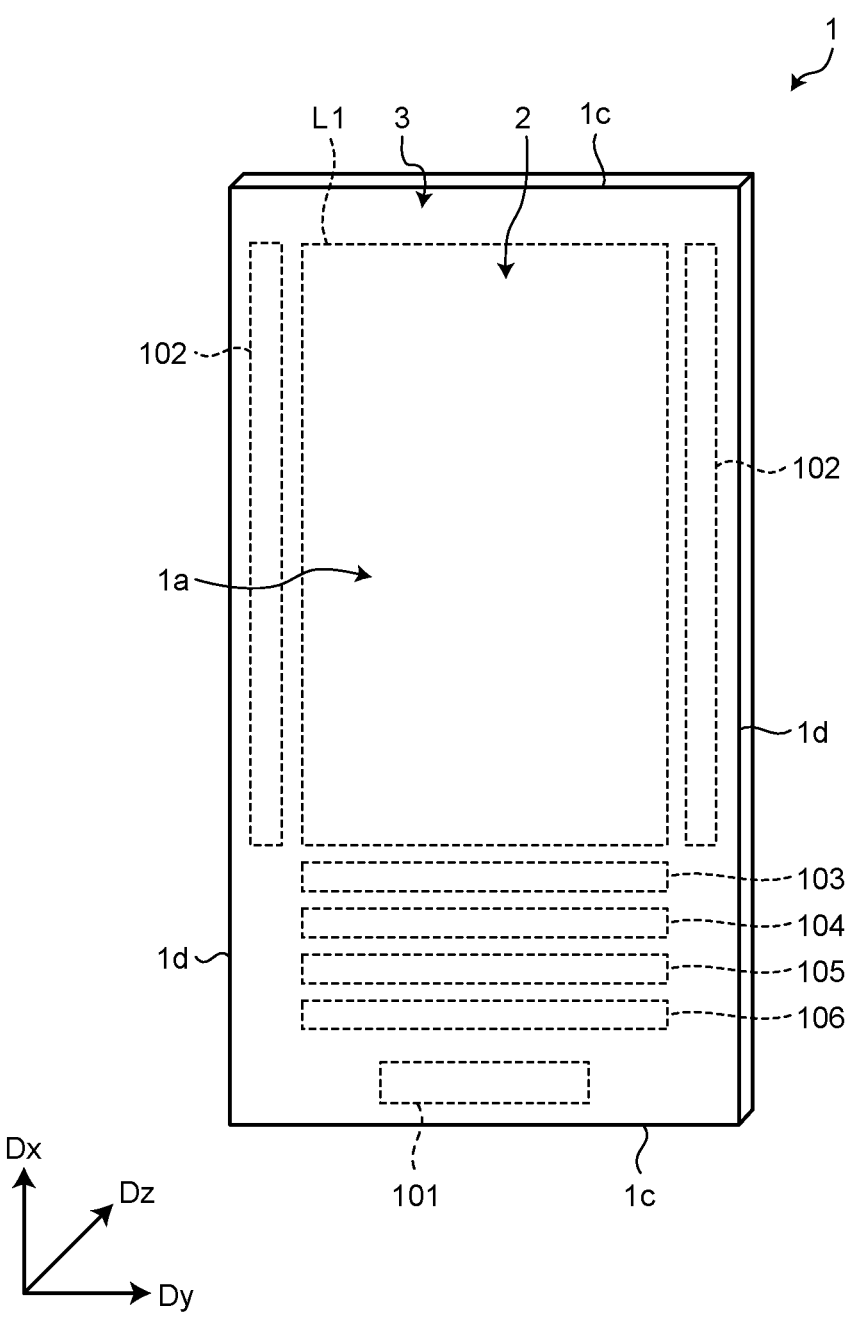
FIG. 1 is a schematic perspective view of a stretchable device according to an embodiment.

Exemplary aspects (embodiments) to embody the present disclosure are described below in greater detail with reference to the accompanying drawings. The contents described in the embodiments below are not intended to limit the invention according to the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present invention and easily conceivable by those skilled in the art naturally fall within the scope of the present disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present specification and the drawings, components similar to those previously described with reference to previous drawings are denoted by the same reference numerals, and detailed explanation thereof may be appropriately omitted.

When the term "on" is used to describe an aspect where a first structure is disposed on or above a second structure in the present specification and the claims, it includes both of the following cases unless otherwise noted: a case where the first structure is disposed on and in contact with the second structure, and a case where the first structure is disposed above the second structure with still another structure interposed therebetween.

Embodiment

FIG. 1 is a schematic perspective view of a stretchable device according to an embodiment. As illustrated in FIG. 1, this stretchable device 1 has a flat plate shape. The stretchable device 1 has a surface 1*a* and a back surface 1*b* (not illustrated in FIG. 1, and refer to FIG. 2) facing opposite to each other.

In the following description, the direction parallel to the surface 1*a* and the back surface 1*b* is referred to as a planar direction. A direction parallel to the planar direction is referred to as a first direction Dx. A direction parallel to the planar direction and intersecting the first direction Dx is referred to as a second direction Dy. The normal direction (stacking direction) of the surface 1*a* is referred to as a third direction Dz. The view of the stretchable device 1 in the third direction Dz may be referred to as plan view.

The stretchable device 1 has a rectangular (quadrilateral) shape in plan view. Therefore, the surface 1*a* has a pair of short sides 1*c* and a pair of long sides 1*d*. The first direction Dx is a direction parallel to the long side 1*d*. The second direction Dy is a direction parallel to the short side 1*c*. Thus, the first direction Dx and the second direction Dy according to the present embodiment are orthogonal to each other.

The stretchable device 1 is divided into a detection region 2 and a peripheral region 3 in plan view. The detection region 2 is a region in which the load applied to the stretchable device 1 can be detected. The peripheral region 3 has a frame-like shape and surrounds the outer periphery of the detection region 2. In FIG. 1, a boundary line L1 is illustrated to make the boundary between the detection region 2 and the peripheral region 3 easy to understand.

Figure 2:
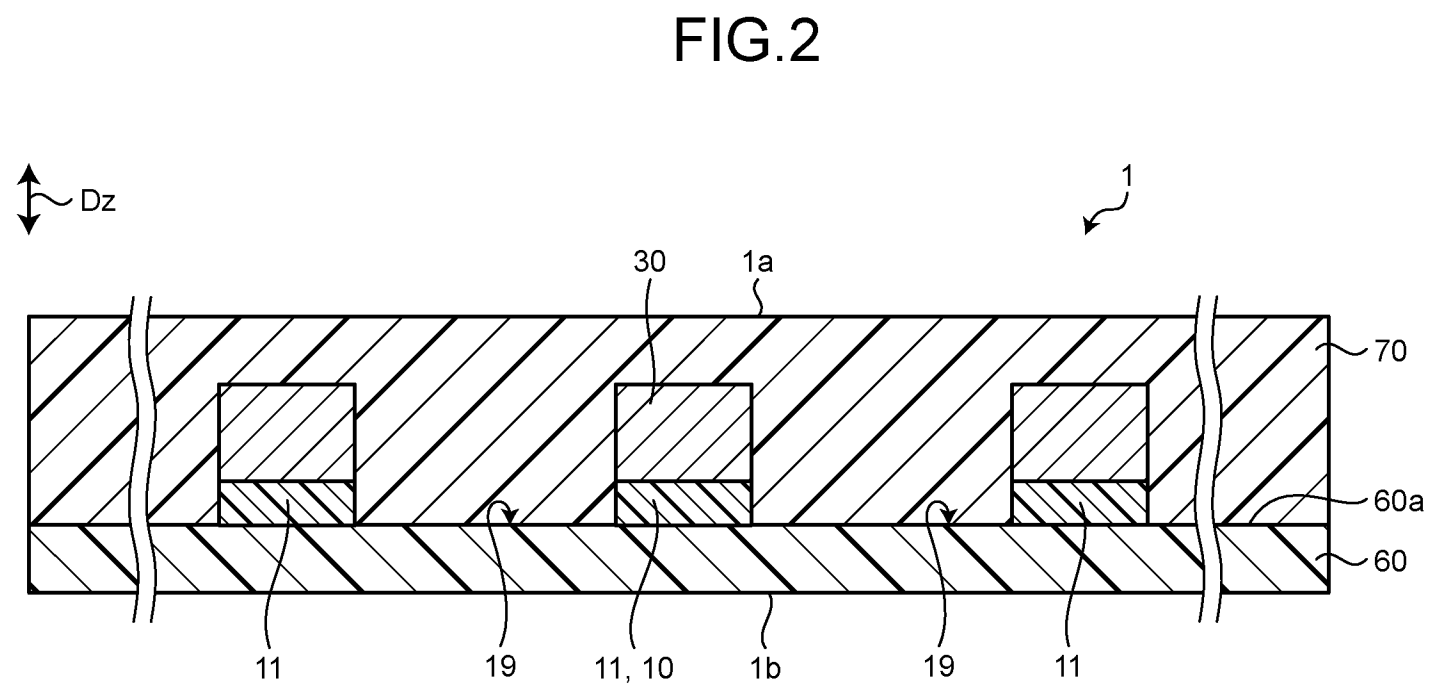
Figure 3:
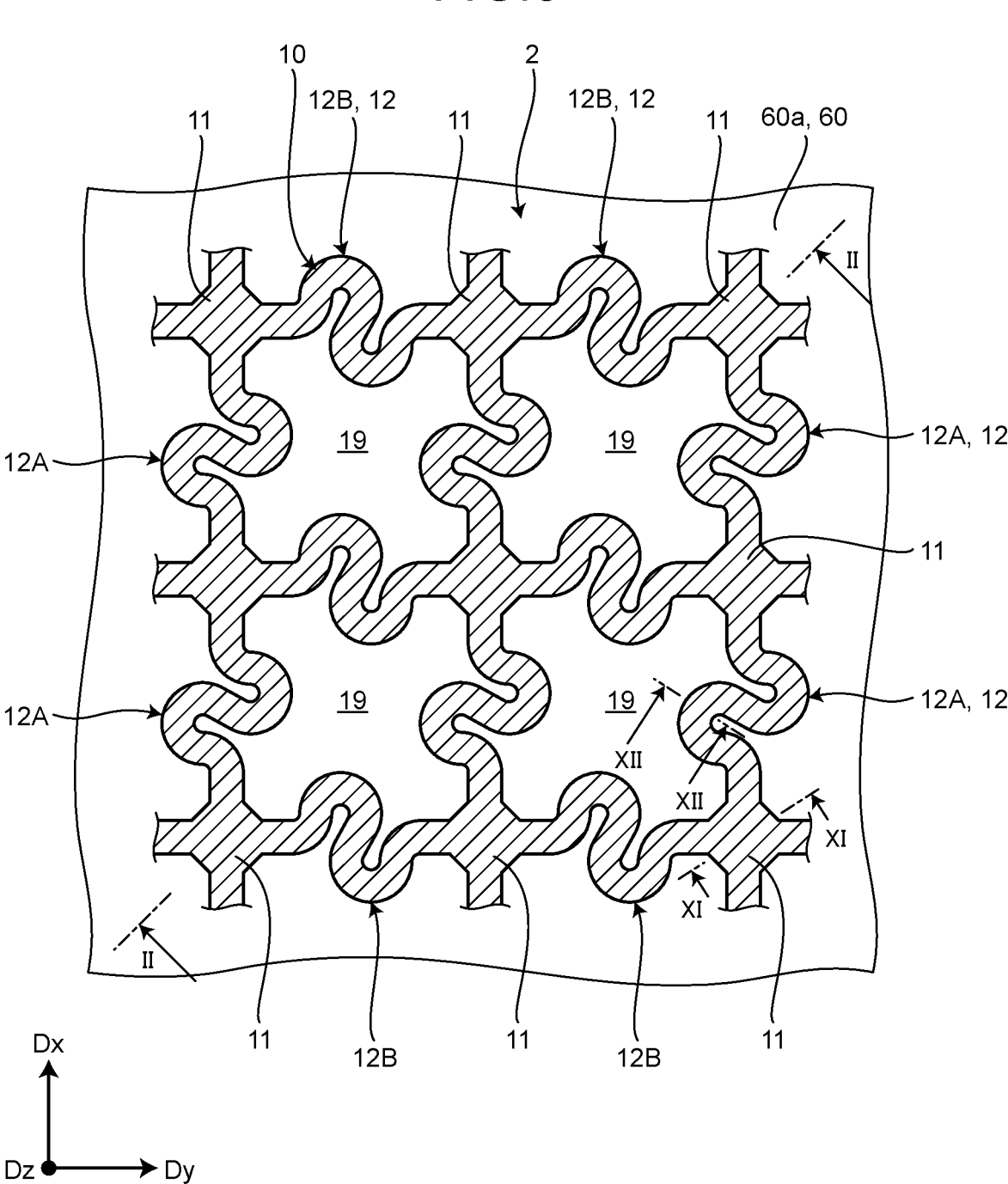
FIG. 3 is an enlarged view of part of a resin base member and a first resin plate viewed from the surface of the stretchable device according to the embodiment.

FIG. 2 is a schematic of a section of the stretchable device according to the embodiment, and more specifically a sectional view along line II-II of FIG. 3. As illustrated in FIG. 2, the stretchable device 1 includes a first resin plate 60, a second resin plate 70, a resin base member 10, and a wiring layer 30. The first resin plate 60 has the back surface 1*b*. The second resin plate 70 has the surface 1*a*. The resin base member 10 and the wiring layer 30 are sandwiched between the first resin plate 60 and the second resin plate 70. The first resin plate 60 and the second resin plate 70 cooperate to serve as a housing that accommodates the resin base member 10 and the wiring layer 30. The first resin plate 60 has a stacking surface 60*a* opposite to the back surface 1*b*. The resin base member 10 and the wiring layer 30 are stacked in this order on the stacking surface 60*a*.

The first resin plate 60 and the second resin plate 70 are made of polyimide and have elasticity and flexibility. The resin material of the first resin plate 60 and the second resin plate 70 is not limited to polyimide and may be acrylic resin, epoxy resin, urethane resin, or the like. The resin material according to the present disclosure is not limited to those described above. In the following description, the upper side or upward refers to one side in the third direction Dz and the side on which the second resin plate 70 is positioned when viewed from the first resin plate 60. The lower side or downward refers to the other side in the third direction Dz and the side on which the first resin plate 60 is positioned when viewed from the second resin plate 70.

FIG. 3 is an enlarged view of part of the resin base member and the first resin plate viewed from the surface of the stretchable device according to the embodiment. In FIG. 3, the resin base member 10 is hatched to make it easy to see the resin base member 10. The resin base member 10 is provided on the stacking surface 60*a* of the first resin plate 60. The resin base member 10 has elastic, flexible, and insulating properties. The resin base member 10 is made of resin material, such as polyimide.

The resin base member 10 includes a plurality of bodies 11 and a plurality of hinges 12 meandering and extending in the planar direction. The bodies 11 and the hinges 12 are disposed in the detection region 2.

The body 11 has a quadrilateral (square) shape in plan view. The body 11 is disposed with its four corners along the first direction Dx and the second direction Dy. The bodies 11 are arrayed in the first direction Dx and the second direction Dy and are separated from one another. The wiring layer 30 stacked on the body 11 includes switching elements (transistors 41) (refer to FIG. 11). The shape of the body 11 according to the present disclosure in plan view is not limited to a quadrilateral shape and may be circular or other polygonal shapes.

The hinge 12 couples the bodies 11 adjacent to each other. The hinges 12 include two kinds of hinges: a longitudinal hinge 12A extending in the first direction Dx, and a lateral hinge 12B extending in the second direction Dy. The part not provided with the bodies 11 or the hinges 12 in the resin base member 10 serves as a hollow portion 19 passing through the resin base member 10 in the third direction Dz. In other words, the resin base member 10 has a plurality of hollow portions 19.

The wiring layer 30 is not stacked on the regions overlapping the hollow portions 19. As illustrated in FIG. 2, the hollow portion 19 is filled with the second resin plate 70. With this configuration, the stretchable device 1 has low rigidity in the area overlapping the hollow portion 19 and has elasticity and bendability (stretchability). When a load acts on the stretchable device 1, the hinges 12 deform. By contrast, the bodies 11 are less deformed, thereby reducing damage to functional elements (transistors 41 according to the present embodiment) stacked on the bodies 11.

While the hollow portion 19 according to the present embodiment is filled with the second resin plate 70, the hollow portion 19 according to the present disclosure may be filled with the first resin plate 60. Alternatively, the hollow portion 19 may be filled with the first resin plate 60 and the second resin plate 70. Still alternatively, the hollow portion 19 may be filled with resin material other than the first resin plate 60 or the second resin plate 70. Still alternatively, the hollow portion 19 may be a space provided with nothing.

The following describes the hinge 12 in greater detail. When the longitudinal hinge 12A is rotated by 90 degrees, it has the same shape as that of the lateral hinge 12B. Therefore, the longitudinal hinge 12A is described below as a representative example.

Figure 4:
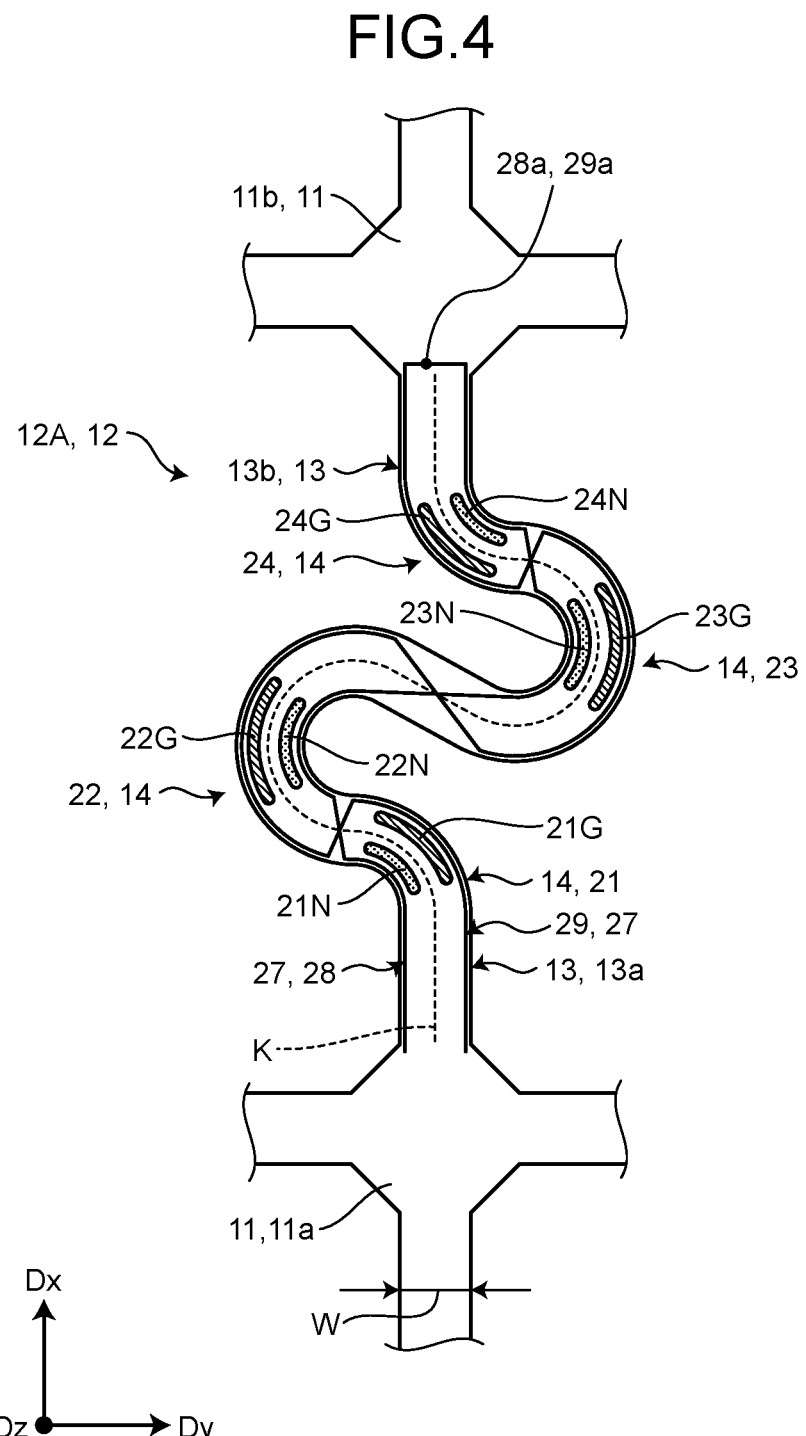
FIG. 4 is an enlarged view of a first hinge according to the embodiment.
Figure 5:
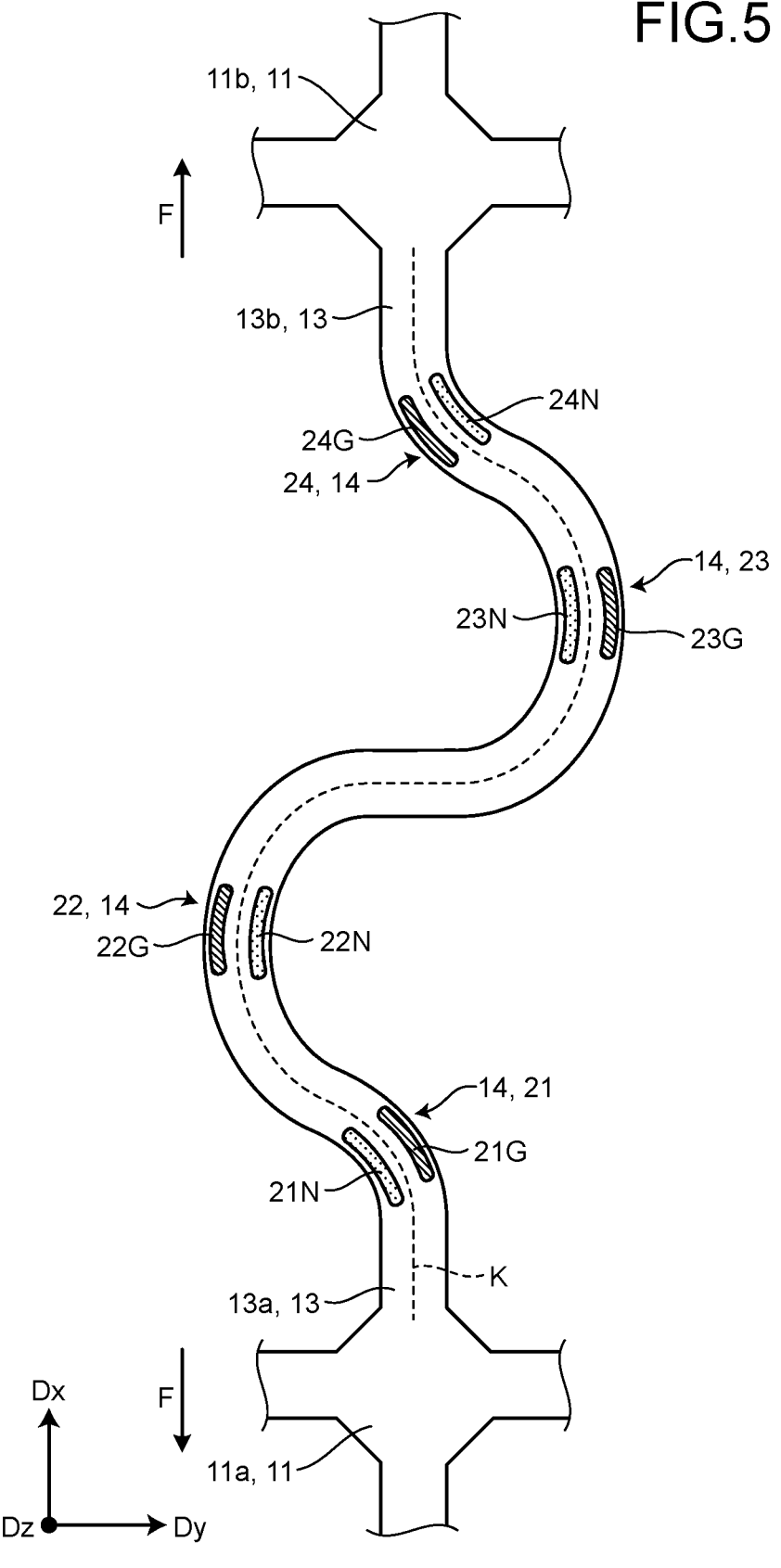
FIG. 5 is an enlarged view of a longitudinal hinge according to the embodiment when a load that stretches the longitudinal hinge in a first direction is applied.

FIG. 4 is an enlarged view of a first hinge according to the embodiment. FIG. 5 is an enlarged view of the longitudinal hinge according to the embodiment when a load that stretches the longitudinal hinge in the first direction is applied. An imaginary line K illustrated in FIGS. 4 and 5 passes through the center of the longitudinal hinge 12A in the width direction.

As illustrated in FIG. 4, a length W of the longitudinal hinge 12A in the width direction is constant in the length direction in which the longitudinal hinge 12A extends. The longitudinal hinge 12A includes two bases 13 and four bends 14. The two bases 13 are disposed at respective ends of the longitudinal hinge 12A in the length direction. The four bends 14 are disposed between the two bases 13. Thus, the longitudinal hinge 12A extends in the first direction Dx while meandering between two bodies 11. For the convenience of explanation, the body 11 coupled to a first end of the longitudinal hinge 12A is referred to as a first body 11a, and the body 11 coupled to a second end thereof is referred to as a second body 11b.

The base 13 is continuous with the body 11 and linearly extends from the body 11 in the first direction Dx. One of the two bases 13 provided continuously with the first body 11a is referred to as a first base 13a, and the other provided continuously with the second body 11b is referred to as a second base 13b.

The bend 14 is bent in the second direction Dy. The bend 14 according to the present embodiment has an arc shape. The bend according to the present disclosure does not necessarily have an arc shape and may have an angular shape. The four bends 14 are a first arc 21, a second arc 22, a third arc 23, and a fourth arc 24 arranged in this order from the first base 13a to the second base 13b. The first arc 21 and the fourth arc 24 each form a quadrant and are bent at 90 degrees. The second arc 22 and the third arc 23 each form a semi-circular arc and are bent at 180 degrees.

One end of the first arc 21 is coupled to the first base 13a. The first arc 21 is bent to one side in the second direction Dy with respect to the first base 13a. One end of the fourth arc 24 is coupled to the second base 13b. The fourth arc 24 is bent from the second base 13b to the other side in the second direction Dy. Therefore, the first arc 21 and the fourth arc 24 are bent in opposite directions.

One end of the second arc 22 is coupled to the first arc 21. The other end of the second arc 22 faces the other side in the second direction Dy. One end of the third arc 23 is coupled to the fourth arc 24, and the other end thereof faces the one side in the second direction Dy and is coupled to the other end of the second arc 22. Thus, the longitudinal hinge 12A meanders by the four bends 14.

As illustrated in FIG. 4, each bend 14 is divided into two portions: an inner peripheral portion positioned on the inner side (inner peripheral side) and an outer peripheral portion positioned on the outer side (outer peripheral side) with respect to the imaginary line K serving as the boundary. In FIG. 4, the inner peripheral portion and the outer peripheral portion of each bend 14 are enclosed by ellipses to define the areas of the inner peripheral portion and the outer peripheral portion. However, the entire area on the inner peripheral side with respect to the imaginary line K is the inner peripheral portion, and the entire area on the outer peripheral side with respect to the imaginary line K is the outer peripheral portion. Therefore, the area enclosed by the ellipse is part of the inner peripheral portion or the outer peripheral portion.

When the stretchable device 1 is pulled in the first direction Dx (refer to arrow F in FIG. 5), the longitudinal hinge 12A stretches in the first direction Dx as illustrated in FIG. 5. In other words, the bending angle of each bend 14 increases, and the length of the longitudinal hinge 12A in the first direction Dx increases. When the bending angle of each bend 14 increases, the following loads (stresses) act on the inner peripheral portion and the outer peripheral portion of each bend 14.

A tensile load acts on a first inner peripheral portion 21N of the first arc 21. A compressive load acts on a first outer peripheral portion 21G of the first arc 21. A tensile load acts on a second inner peripheral portion 22N of the second arc 22. A compressive load acts on a second outer peripheral portion 22G of the second arc 22. A tensile load acts on a third inner peripheral portion 23N of the third arc 23. A compressive load acts on a third outer peripheral portion 23G of the third arc 23. A tensile load acts on a fourth inner peripheral portion 24N of the fourth arc 24. A compressive load acts on a fourth outer peripheral portion 24G of the fourth arc 24.

Thus, when the longitudinal hinge 12A stretches in the first direction Dx, a tensile load acts on the inner peripheral portion of each bend 14, and a compressive load acts on the outer peripheral portion of each bend 14.

As illustrated in FIG. 4, a strain gauge 27 is provided in the wiring layer 30 on the hinge 12. The strain gauge 27 deforms corresponding to deformation of the hinge 12, thereby changing its resistance. The strain gauge 27 includes a first strain gauge 28 and a second strain gauge 29 that are made of the same material. The first strain gauge 28 and the second strain gauge 29 may be made of different materials. The first strain gauge 28 extends from the first body 11a (first end of the hinge 12) to the second body 11b (second end of the hinge 12). The second strain gauge 29 extends from the second body 11b (second end of the hinge 12) to the first body 11a (first end of the hinge 12). A first end 28a of the first strain gauge 28 and a first end 29a of the second strain gauge 29 are coupled on the second body 11b (second end of the hinge).

The first strain gauge 28 is disposed overlapping only the inner peripheral portions (the first inner peripheral portion 21N, the second inner peripheral portion 22N, the third inner peripheral portion 23N, and the fourth inner peripheral portion 24N) at the bends 14. In the following description, such a strain gauge 27 may be referred to as an inner peripheral strain gauge. By contrast, the second strain gauge 29 is disposed overlapping only the outer peripheral portions (the first outer peripheral portion 21G, the second outer peripheral portion 22G, the third outer peripheral portion 23G, and the fourth outer peripheral portion 24G) at the bends 14. In the following description, such a strain gauge 27 may be referred to as an outer peripheral strain gauge. Thus, when the hinge 12 stretches in the first direction Dx, the first strain gauge 28 is subjected to a common stress (tensile load) at portions overlapping the respective bends 14. The second strain gauge 29 is subjected to a common stress (compressive load) at portions overlapping the respective bends 14. The first strain gauge 28 according to the present disclosure may be an outer peripheral strain gauge, and the second strain gauge 29 according to the present disclosure may be an inner peripheral strain gauge.

The strain gauges 27 include two kinds of strain gauges: a longitudinal strain gauge 127 (refer to FIG. 7) disposed on the longitudinal hinge 12A, and a lateral strain gauge 227 (refer to FIG. 8) disposed on the lateral hinge 12B. The longitudinal strain gauge 127 includes a first longitudinal strain gauge 128 (refer to FIG. 7) and a second longitudinal strain gauge 129 (refer to FIG. 7). Similarly, the lateral strain gauge 227 (refer to FIG. 8) includes a first lateral strain gauge 228 (refer to FIG. 8) and a second lateral strain gauge 229 (refer to FIG. 8). The following describes the wiring layer 30.

Figure 6:
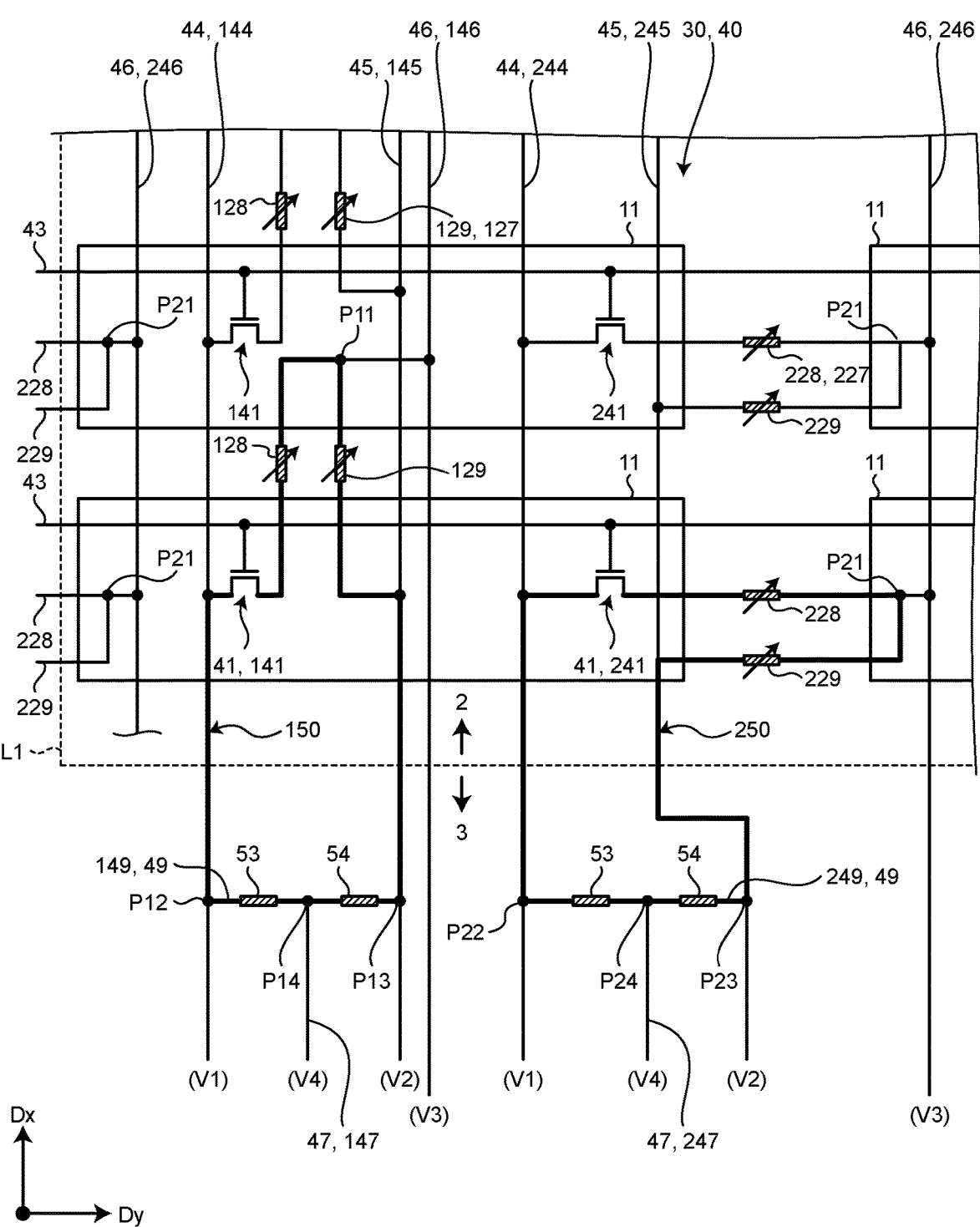
FIG. 6 is a circuit diagram of a wiring layer according to the embodiment.

FIG. 6 is a circuit diagram of the wiring layer according to the embodiment. The wiring layer 30 is a layer for detecting the amount of strain of the hinge 12. As illustrated in FIG. 6, the wiring layer 30 includes a plurality of strain gauges 27 described above and electrical wiring 40. The electrical wiring 40 includes a switching element (transistor 41), a gate line 43, a first potential line 44, a second potential line 45, a first signal line 46, a second signal line 47, and a coupling line 49. The switching element is disposed on each body 11. The gate line 43 extends in the second direction Dy. The first potential line 44, the second potential line 45, and the first signal line 46 extend in the first direction Dx. The second signal line 47 and the coupling line 49 are disposed in the peripheral region 3. The components of the electrical wiring 40 will be described later.

As illustrated in FIG. 1, the wiring layer 30 includes a coupler 101, a gate line drive circuit 102, a first potential line selection circuit 103, a second potential line selection circuit 104, a first signal line selection circuit 105, and a second signal line selection circuit 106 disposed in the peripheral region 3 to drive the electrical wiring 40.

The coupler 101 is coupled to a drive integrated circuit (IC) disposed outside the stretchable device 1. The drive IC may be mounted as a chip on film (COF) on a flexible printed circuit board or a rigid board (not illustrated) coupled to the coupler 101. Alternatively, the drive IC may be mounted as a chip on glass (COG) in the peripheral region 3 of the first resin plate 60.

The gate line drive circuit 102 is a circuit that drives a plurality of gate lines 43 (refer to FIG. 6) based on various control signals supplied from the drive IC. The gate line drive circuit 102 sequentially or simultaneously selects the gate lines 43 and supplies gate drive signals to the selected gate line 43.

The first potential line selection circuit 103 is a switch circuit that sequentially or simultaneously selects a plurality of first potential lines 44. The first potential line selection circuit 103 couples the selected first potential line 44 to the drive IC based on selection signals supplied from the drive IC and applies a predetermined first potential V1 to the first potential line 44.

The second potential line selection circuit 104 is a switch circuit that sequentially or simultaneously selects a plurality of second potential lines 45. The second potential line selection circuit 104 couples the selected second potential line 45 to the drive IC based on selection signals supplied from the drive IC and applies a predetermined second potential V2 to the second potential line 45. The second potential V2 is lower than the first potential V1 (V2<V1). The second potential V2 according to the present embodiment is 0 V.

The first signal line selection circuit 105 is a switch circuit that sequentially or simultaneously selects a plurality of first signal lines 46. The first signal line selection circuit 105 couples the first signal line 46 to the drive IC based on selection signals supplied from the drive IC. As a result, the signal (potential) of the first signal line 46 is transmitted to the drive IC.

The second signal line selection circuit 106 is a switch circuit that sequentially or simultaneously selects a plurality of second signal lines 47. The second signal line selection circuit 106 couples the second signal line 47 to the drive IC based on selection signals supplied from the drive IC. As a result, the signal (potential) of the second signal line 47 is transmitted to the drive IC. The following describes the components of the electrical wiring 40 in greater detail.

Figure 7:
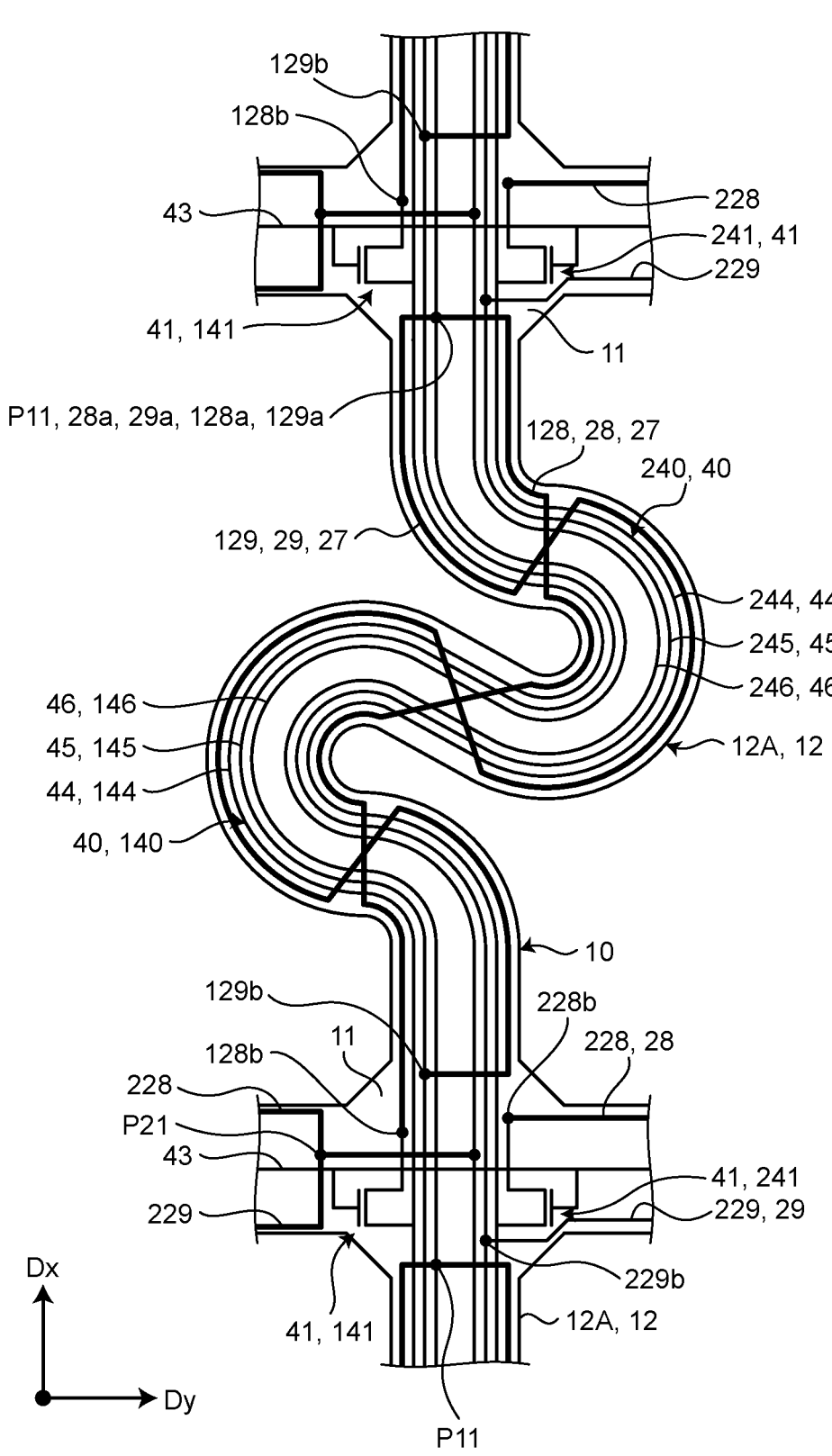
FIG. 7 is a plan view of bodies and the longitudinal hinge according to the embodiment.
Figure 8:
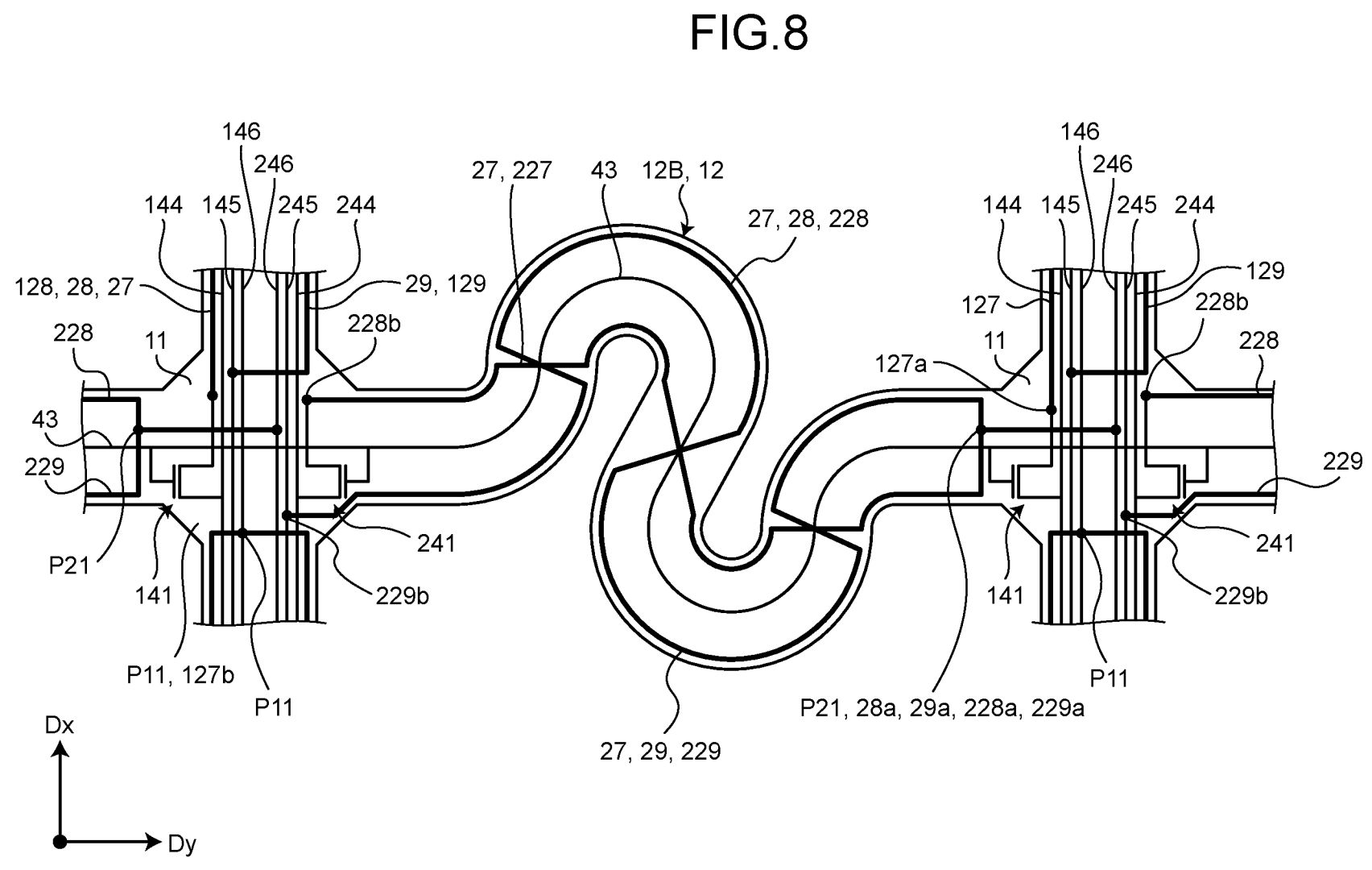

FIG. 7 is a plan view of the bodies and the longitudinal hinge according to the embodiment. FIG. 8 is a plan view of the bodies and the lateral hinge according to the embodiment. As illustrated in FIG. 7, the electrical wiring 40 includes an electrical wiring line 140 for longitudinal strain coupled to the longitudinal strain gauge 127 and an electrical wiring line 240 for lateral strain coupled to the lateral strain gauge 227. The gate line 43 is shared by the electrical wiring line 140 for longitudinal strain and the electrical wiring line 240 for lateral strain. The following describes the gate line 43 first.

As illustrated in FIG. 8, the gate line 43 is disposed over a plurality of lateral hinges 12B and a plurality of bodies 11. As a result, the gate line 43 extends in the second direction Dy in the detection region 2. A plurality of gate lines 43 are arrayed in the first direction Dx (refer to FIG. 7). The end of the gate line 43 in the second direction Dy extends in the peripheral region 3 and is coupled to the gate line drive circuit 102.

As illustrated in FIG. 7, the electrical wiring line 140 for longitudinal strain includes a transistor 141 for longitudinal strain, a first potential line 144 for longitudinal strain, a second potential line 145 for longitudinal strain, a first signal line 146 for longitudinal strain, a second signal line 147 for longitudinal strain (refer to FIG. 6), and a coupling line 149 for longitudinal strain (refer to FIG. 6).

The first potential line 144 for longitudinal strain, the second potential line 145 for longitudinal strain, and the first signal line 146 for longitudinal strain are disposed over a plurality of longitudinal hinges 12A and a plurality of bodies 11. As a result, the first potential line 144 for longitudinal strain, the second potential line 145 for longitudinal strain, and the first signal line 146 for longitudinal strain extend in the first direction Dx in the detection region 2. A plurality of first potential lines 144 for longitudinal strain, a plurality of second potential lines 145 for longitudinal strain, and a plurality of first signal lines 146 for longitudinal strain are arrayed in the second direction Dy (refer to FIG. 8).

The ends of the first potential line 144 for longitudinal strain, the second potential line 145 for longitudinal strain, and the first signal line 146 for longitudinal strain extend to the peripheral region 3 (refer to FIG. 6). The first potential line 144 for longitudinal strain is coupled to the first potential line selection circuit 103 (refer to FIG. 1). The second potential line 145 for longitudinal strain is coupled to the second potential line selection circuit 104 (refer to FIG. 1). The first signal line 146 for longitudinal strain is coupled to the first signal line selection circuit 105 (refer to FIG. 1).

As illustrated in FIG. 7, the transistors 141 for longitudinal strain are disposed on the respective bodies 11. The gate electrode of the transistor 141 for longitudinal strain is coupled to the gate line 43. The drain electrode of the transistor 141 for longitudinal strain is coupled to the first potential line 144 for longitudinal strain. The source electrode of the transistor 141 for longitudinal strain is coupled to a second end 128b of the first longitudinal strain gauge 128. Thus, the transistor 141 for longitudinal strain is interposed between the first potential line 144 for longitudinal strain and the second end 128b of the first longitudinal strain gauge 128.

A first end 128a of the first longitudinal strain gauge 128 is coupled to a first end 129a of the second longitudinal strain gauge 129. A second end 129b of the second longitudinal strain gauge 129 is coupled to the second potential line 145 for longitudinal strain. Therefore, when the transistor 141 for longitudinal strain is ON, the potential differ-ence (voltage) between the first potential V1 and the second potential V2 is applied to the first longitudinal strain gauge 128 and the second longitudinal strain gauge 129.

The coupling point between the first end 128a of the first longitudinal strain gauge 128 and the first end 129a of the second longitudinal strain gauge 129 is referred to as a first coupling point P11. The first coupling point P11 is coupled to the first signal line 146 for longitudinal strain. Therefore, the first signal line 146 for longitudinal strain receives the potential of the first coupling point P11 (hereinafter referred to as a third potential V3).

As illustrated in FIG. 6, the second signal line 147 for longitudinal strain and the coupling line 149 for longitudinal strain are disposed in the peripheral region 3. The coupling line 149 for longitudinal strain couples the first potential line 144 for longitudinal strain to the second potential line 145 for longitudinal strain. In the following description, the coupling point between the coupling line 149 for longitu-dinal strain and the first potential line 144 for longitudinal strain is referred to as a second coupling point P12. The coupling point between the coupling line 149 for longitu-dinal strain and the second potential line 145 for longitudinal strain is referred to as a third coupling point P13.

One end of the second signal line 147 for longitudinal strain is coupled to a midpoint P14 of the coupling line 149 for longitudinal strain. Therefore, the second signal line 147 for longitudinal strain receives the potential of the midpoint P14 (hereinafter referred to as a fourth potential V4). The other end of the second signal line 147 for longitudinal strain is coupled to the second signal line selection circuit 106.

The electrical wiring line 240 for lateral strain includes a transistor 241 for lateral strain, a first potential line 244 for lateral strain, a second potential line 245 for lateral strain, a first signal line 246 for lateral strain, a second signal line 247 for lateral strain (refer to FIG. 6), and a coupling line 249 for lateral strain (refer to FIG. 6).

As illustrated in FIG. 7, the first potential line 244 for lateral strain, the second potential line 245 for lateral strain, and the first signal line 246 for lateral strain are disposed over a plurality of longitudinal hinges 12A and a plurality of bodies 11. As a result, the first potential line 244 for lateral strain, the second potential line 245 for lateral strain, and the first signal line 246 for lateral strain extend in the first direction Dx in the detection region 2. A plurality of first potential lines 244 for lateral strain, a plurality of second potential lines 245 for lateral strain, and a plurality of first signal lines 246 for lateral strain are arrayed in the second direction Dy (refer to FIG. 8).

The ends of the first potential line 244 for lateral strain, the second potential line 245 for lateral strain, and the first signal line 246 for lateral strain extend to the peripheral region 3 (refer to FIG. 6). The first potential line 244 for lateral strain is coupled to the first potential line selection circuit 103 (refer to FIG. 1). The second potential line 245 for lateral strain is coupled to the second potential line selection circuit 104 (refer to FIG. 1). The first signal line 246 for lateral strain is coupled to the first signal line selection circuit 105 (refer to FIG. 1).

The transistors 241 for lateral strain are disposed on the respective bodies 11. The gate electrode of the transistor 241 for lateral strain is coupled to the gate line 43. The drain electrode of the transistor 241 for lateral strain is coupled to the first potential line 244 for lateral strain. The source electrode of the transistor 241 for lateral strain is coupled to a second end 227b of the first lateral strain gauge 227. Thus, the transistor 241 for lateral strain is interposed between the first potential line 244 for lateral strain and the second end 227b of the first lateral strain gauge 227.

As illustrated in FIG. 8, a first end 228a of the first lateral strain gauge 228 is coupled to a first end 229a of the second lateral strain gauge 229. A second end 229b of the second lateral strain gauge 229 is coupled to the second potential line 245 for lateral strain. Therefore, when the transistor 241 for lateral strain is ON, the potential difference (voltage) between the first potential V1 and the second potential V2 is applied to the first lateral strain gauge 228 and the second lateral strain gauge 229.

The coupling point between the first end 228a of the first lateral strain gauge 228 and the first end 229a of the second lateral strain gauge 229 is referred to as a first coupling point P21. The first coupling point P21 is coupled to the first signal line 246 for lateral strain. Therefore, the first signal line 246 for lateral strain receives the potential of the first coupling point P21 (hereinafter referred to as the third potential V3).

As illustrated in FIG. 6, the second signal line 247 for lateral strain and the coupling line 249 for lateral strain are disposed in the peripheral region 3. The coupling line 249 for lateral strain couples the first potential line 244 for lateral strain to the second potential line 245 for lateral strain. In the following description, the coupling point between the cou-pling line 249 for lateral strain and the first potential line 244 for lateral strain is referred to as a second coupling point P22. The coupling point between the coupling line 249 for lateral strain and the second potential line 245 for lateral strain is referred to as a third coupling point P23.

One end of the second signal line 247 for lateral strain is coupled to a midpoint P24 of the coupling line 249 for lateral strain. Therefore, the second signal line 247 for lateral strain receives the potential of the midpoint P24 (hereinafter referred to as the fourth potential V4). The other end of the second signal line 247 for lateral strain is coupled to the second signal line selection circuit 106.

As illustrated in FIG. 6, when the transistors 41 (141 and 241) are ON in the electrical wiring 40 (the electrical wiring line 140 for longitudinal strain and the electrical wiring line 240 for lateral strain), four wiring lines coupling the first coupling point P11, the second coupling point P12, the third coupling point P13, and the midpoint P14, and four wiring lines coupling the first coupling point P21, the second coupling point P22, the third coupling point P23, and the midpoint P24 each constitute a circuit (a first circuit 150 and a second circuit 250). To make the circuits (the first circuit 150 and the second circuit 250) easier to understand, the wiring constituting the circuits is illustrated thicker than the other wiring in FIG. 6.

The first strain gauges 28 (the first longitudinal strain gauge 128 and the first lateral strain gauge 228) are respec-tively disposed between the first coupling point P11 and the second coupling point P12 and between the first coupling point P21 and the second coupling point P22. The second strain gauges 29 (the second longitudinal strain gauge 129 and the second lateral strain gauge 229) are respectively disposed between the third coupling point P13 and the first coupling point P11 and between the third coupling point P23 and the first coupling point P21. The first strain gauge 28 has a first resistance R1 obtained when no strain is generated. The second strain gauge 29 has a second resistance R2 obtained when no strain is generated. The first resistance R1 is equal to the second resistance R2.

As illustrated in FIG. 4, the second strain gauges 29 overlap the outer peripheral portions of the bends 14 in the hinge 12 and are longer than the first strain gauges 28 that overlap the inner peripheral portions of the bends 14.

Therefore, the second resistance R2 of the second strain gauge 29 is usually higher than the first resistance R1 of the first strain gauge 28. The width W1 (refer to FIG. 12) of the first strain gauge 28 according to the present embodiment is larger than the width W2 of the second strain gauge 29. As a result, the first resistance R1 is equal to the second resistance R2. In the present disclosure, the resistance of the first strain gauge 28 may be made equal to that of the second strain gauge 29 by other methods.

As illustrated in FIG. 6, a third resistor component 53 with a third resistance R3 is disposed between the second coupling point P12 and the midpoint P14 and between the second coupling point P22 and the midpoint P24. A fourth resistor component 54 with a fourth resistance R4 is disposed between the third coupling point P13 and the midpoint P14 and between the third coupling point P23 and the midpoint P24. The third resistance R3 of the third resistor component 53 and the fourth resistance R4 of the fourth resistor component 54 are fixed (do not change). The third resistor components 53 and the fourth resistor components 54 are disposed in the peripheral region 3. The third resistance R3 and the fourth resistance R4 are equal to the first resistance R1 and the second resistance R2 (R1=R2=R3=R4).

Figure 9:
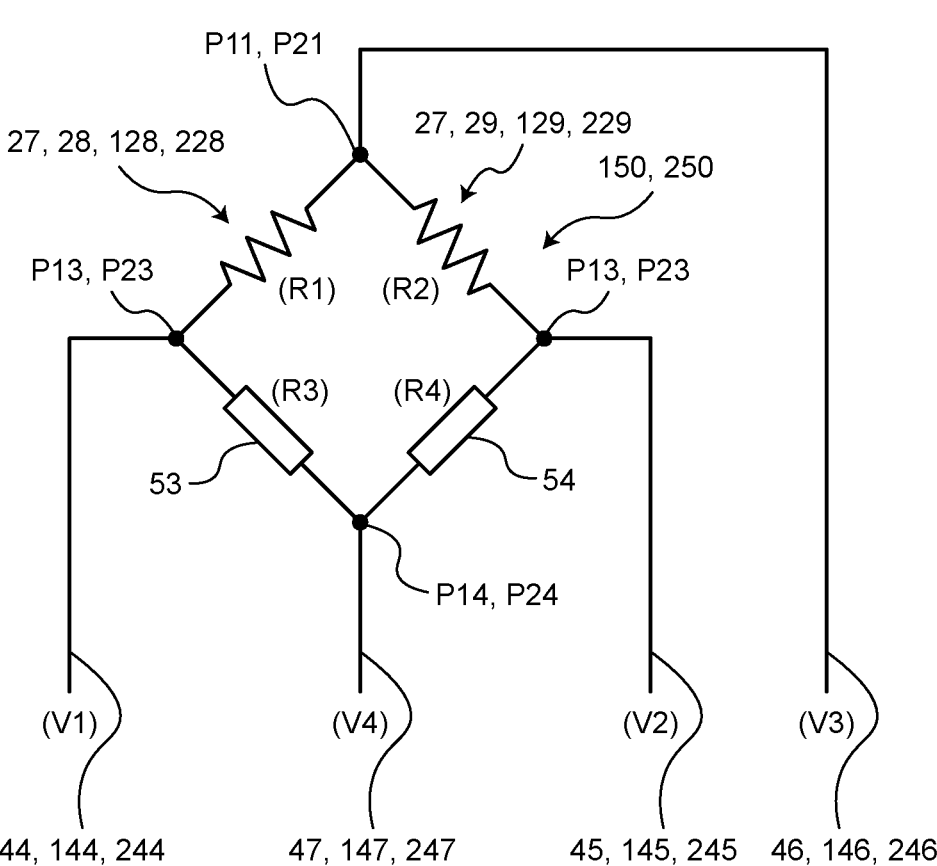
FIG. 9 is a diagram schematically illustrating a circuit according to the embodiment.

FIG. 9 is a diagram schematically illustrating the circuit according to the embodiment. As illustrated in FIG. 9, the circuits (the first circuit 150 and the second circuit 250) each serve as a Wheatstone bridge circuit. In other words, the amount of change in resistance of each of the strain gauges 27 (the first strain gauge 28 and the second strain gauge 29) can be detected based on the potential difference between the third potential V3 detected from the first signal line 46 and the fourth potential V4 detected from the second signal line 47.

When no strain is generated in the strain gauge 27, for example, the third potential V3 at each of the first coupling points P11 and P21 read by the first signal line 46 and the fourth potential V4 at each of the midpoints P14 and P24 read by the second signal line 47 are the same potential.

Figure 10:
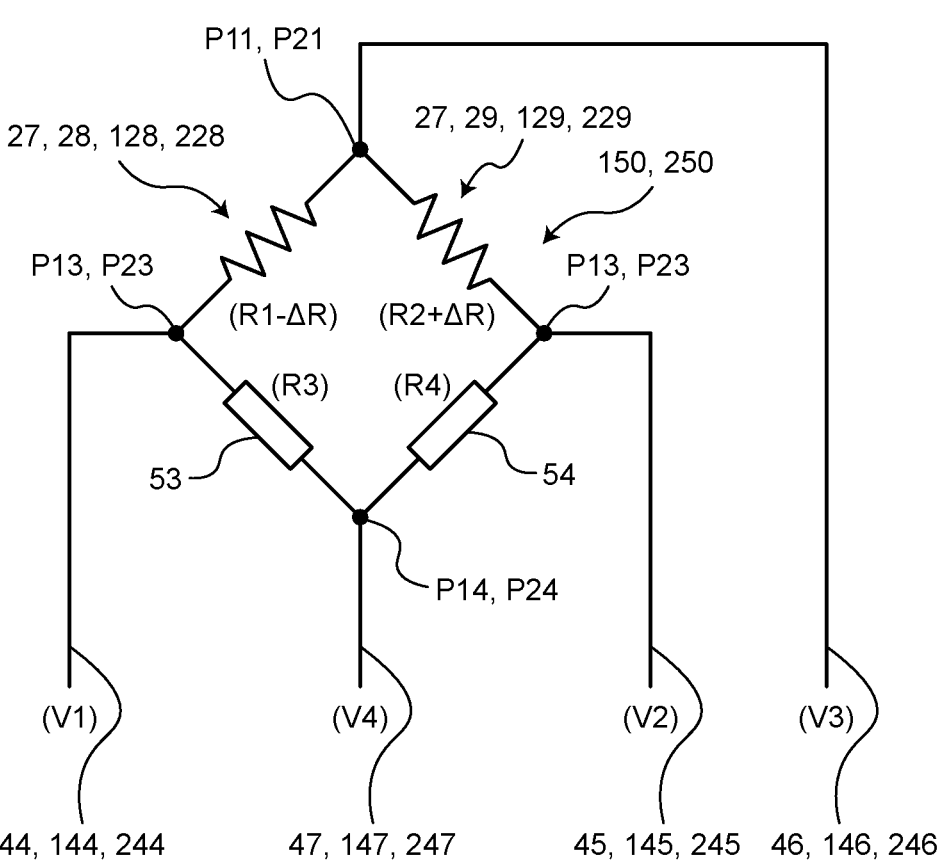
FIG. 10 is a diagram schematically illustrating the circuit according to the embodiment when the hinge is deformed.

By contrast, when the hinge 12 stretches (refer to FIG. 5), a tensile load acts on the first strain gauge 28 as illustrated in FIG. 10. The first resistance of the first strain gauge 28 is reduced by ΔR and is (R1−ΔR). In other words, the third potential V3 at each of the first coupling points P11 and P21 increases. In addition, a compressive load acts on the second strain gauge 29. The second resistance of the second strain gauge 29 is increased by ΔR and is (R2+ΔR). In other words, the third potential V3 further increases. Therefore, the amount of change in the third potential V3 is larger and the sensitivity to detect the amount of strain of the hinge 12 is higher than in a case where only one of the first strain gauge 28 and the second strain gauge 29 is disposed on the hinge 12.

The first signal line 46 is provided outside the circuits (the first circuit 150 and the second circuit 250). Therefore, the first signal line 46 does not affect the potentials of the first coupling points P11 and P21. The coupling line 49 is disposed in the peripheral region 3 and is not deformed. Therefore, the amount of change in resistance (third resistance R3 of the third resistor component 53) from the second coupling points P12 and P22 to the midpoints P14 and P24 is zero. Similarly, the amount of change in resistance (fourth resistance R4 of the fourth resistor component 54) from the midpoints P14 and P24 to the third coupling points P13 and P23 is zero. Therefore, the first signal line 46 does not affect the potentials of the first coupling points P11 and P21.

The following describes the sectional structure of the wiring layer 30. The following describes the sectional structure by severally explaining part of the wiring layer 30 stacked on the body 11 and part thereof stacked on the hinge 12.

Figure 11:
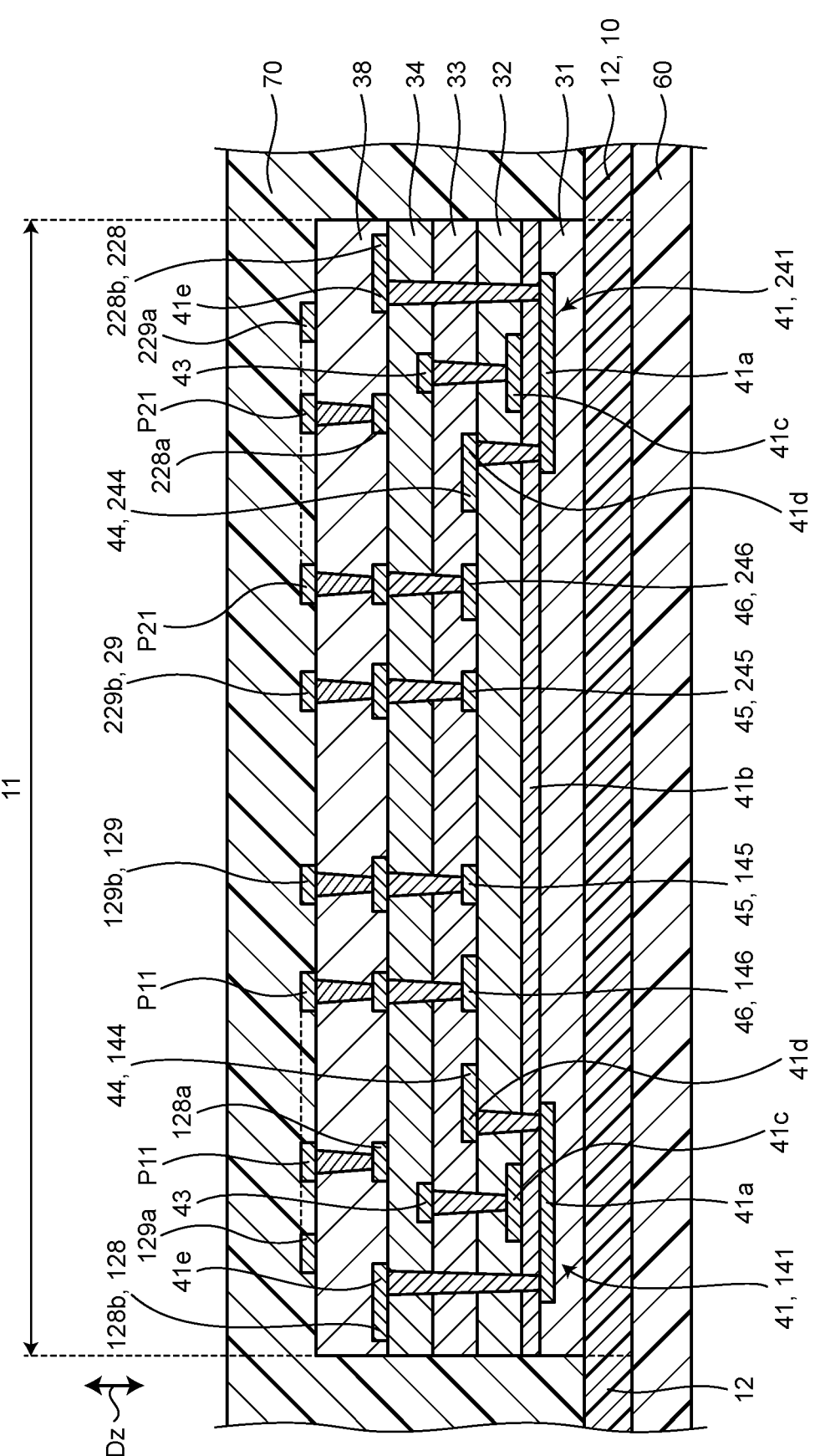
FIG. 11 is a sectional view seen in the arrow direction along line XI-XI of FIG. 3.

FIG. 11 is a sectional view seen in the arrow direction along line XI-XI of FIG. 3. A plurality of insulating layers are stacked on the part of the wiring layer 30 stacked on the body 11. Specifically, the insulating layers are a first insulating layer 31, a second insulating layer 32, a third insulating layer 33, a fourth insulating layer 34, and a fifth insulating layer 38 sequentially stacked on the body 11. The first insulating layer 31, the second insulating layer 32, the third insulating layer 33, the fourth insulating layer 34, and the fifth insulating layer 38 are silicon oxide films, for example, and cover the components of the strain gauge 27 and the electrical wiring 40. A gate insulating film 41b of the transistor 41 is interposed between the first insulating layer 31 and the second insulating layer 32.

The first potential lines 44 (the first potential line 144 for longitudinal strain and the first potential line 244 for lateral strain), the second potential lines 45 (the second potential line 145 for longitudinal strain and the second potential line 245 for lateral strain), and the first signal lines (the first signal line 146 for longitudinal strain and the first signal line 246 for lateral strain) are stacked on the second insulating layer 32. The gate line 43 is stacked on the third insulating layer 33. The strain gauges 27 (the longitudinal strain gauge 127 and the lateral strain gauge 227) are stacked on the fourth insulating layer 34. The strain gauges 27 are covered with the second resin plate 70 to secure the insulation of the strain gauges 27. In the present disclosure, an insulating layer made of a silicon oxide film may be provided on the strain gauges 27 and be covered with the second resin plate 70.

The transistors 41 (the transistor 141 for longitudinal strain and the transistor 241 for lateral strain) each include a semiconductor layer 41a, the gate insulating film 41b, a gate electrode 41c, a drain electrode 41d, and a source electrode 41e. The semiconductor layer 41a is coupled to the drain electrode 41d and the source electrode 41e via a contact layer.

The gate electrode 41c is coupled to the gate line 43 via a contact layer. The drain electrode 41d is disposed in the same layer as that of the first potential line 44 (the first potential line 144 for longitudinal strain or the first potential line 244 for lateral strain) and is coupled to the first potential line 44 (the first potential line 144 for longitudinal strain or the first potential line 244 for lateral strain). The source electrode 41e is disposed in the same layer as that of the first longitudinal strain gauge 128 and the first lateral strain gauge 228. The source electrode 41e is coupled to the second end 128b of the first longitudinal strain gauge 128 or the second end 228b of the first lateral strain gauge 228.

A conductive layer serving as the first coupling point P11 and the second coupling point P21 is provided on the fifth insulating layer 38. The first coupling point P11 (conductive layer) is coupled to the first signal line 46 (first signal line 146 for longitudinal strain). The second coupling point P21 (conductive layer) is coupled to the first signal line 46 (first signal line 246 for lateral strain). The first coupling point P11 is coupled to the first end 128a of the first longitudinal strain gauge 128 stacked on the fourth insulating layer 34 by a contact layer. The second coupling point P21 is coupled to the first end 228a of the first lateral strain gauge 228 stacked on the fourth insulating layer 34 by a contact layer.

The second longitudinal strain gauge 129 and the second lateral strain gauge 229 are disposed in a layer different from that of the first longitudinal strain gauge 128 and the first lateral strain gauge 228. Specifically, the first longitudinal strain gauge 128 and the first lateral strain gauge 228 are stacked on the fourth insulating layer 34. The second longitudinal strain gauge 129 and the second lateral strain gauge 229 are stacked on the fifth insulating layer 38.

The second end 129*b* of the second longitudinal strain gauge 129 is coupled to the second potential line 45 (second potential line 145 for longitudinal strain). The second end 229*b* of the second lateral strain gauge 229 is coupled to the second potential line 45 (second potential line 245 for lateral strain). The first end 129*a* of the second longitudinal strain gauge 129 is coupled to the first coupling point P11 (conductive layer). As a result, the first end 129*a* of the second longitudinal strain gauge 129 is coupled to the first end 128*a* of the first longitudinal strain gauge 128. The first end 229*a* of the second lateral strain gauge 229 is coupled to the second coupling point P21 (conductive layer). As a result, the first end 229*a* of the second lateral strain gauge 229 is coupled to the first end 228*a* of the first lateral strain gauge 228.

Figure 12:
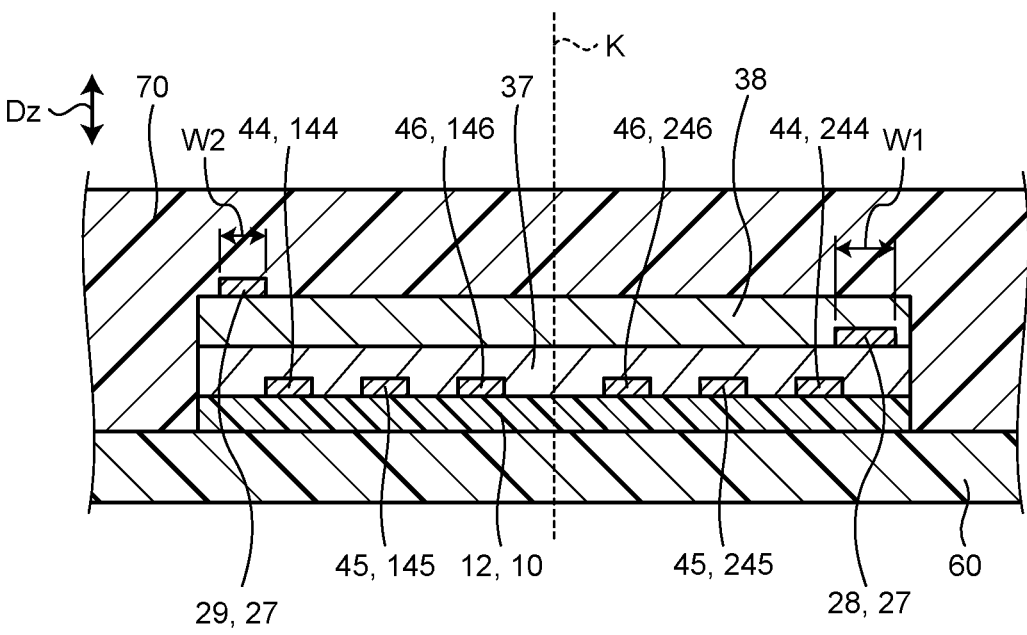
FIG. 12 is a sectional view seen in the arrow direction along line XII-XII of FIG. 3.

FIG. 12 is a sectional view seen in the arrow direction along line XII-XII of FIG. 3. The following describes the part of the wiring layer 30 stacked on the longitudinal hinge 12A. The first potential lines 44 (the first potential line 144 for longitudinal strain and the first potential line 244 for lateral strain), the second potential lines 45 (the second potential line 145 for longitudinal strain and the second potential line 245 for lateral strain), and the first signal lines 46 (the first signal line 146 for longitudinal strain and the first signal line 246 for lateral strain) are disposed on the longitudinal hinge 12A.

The first potential line 44, the second potential line 45, and the first signal line 46 are covered with an insulating layer 37. The first strain gauge 28 (first longitudinal strain gauge 128) is stacked on the insulating layer 37. The first strain gauge 28 (first longitudinal strain gauge 128) is covered with the fifth insulating layer 38. The fifth insulating layer 38 extends from the body 11 (refer to FIG. 11). The second strain gauge 29 (second longitudinal strain gauge 129) is stacked on the fifth insulating layer 38. Therefore, the first strain gauge 28 (first longitudinal strain gauge 128) and the second strain gauge 29 (second longitudinal strain gauge 129) are disposed in different layers. The second strain gauge 29 (second longitudinal strain gauge 129) is covered with the second resin plate 70 to secure the insulation of the second strain gauge 29. While the resin material of the insulating layer 37 is not particularly limited, polyimide or the like with high flexibility is preferable.

The following describes the part of the wiring layer 30 stacked on the lateral hinge 12B. The gate line 43 is stacked on the longitudinal hinge 12A, which is not particularly illustrated. The gate line 43 is covered with the insulating layer 37. The lateral strain gauge 227 is stacked on the insulating layer 37. The first strain gauge 28 (first lateral strain gauge 228) is covered with the fifth insulating layer 38. The second strain gauge 29 (second lateral strain gauge 229) is stacked on the fifth insulating layer 38. The second strain gauge 29 (second lateral strain gauge 229) is covered with the second resin plate 70 to secure the insulation of the second strain gauge 29.

As described above, the stretchable device 1 according to the embodiment has high sensitivity to detect the amount of strain of the hinge 12.

While the embodiment has been described above, the present disclosure is not limited to the example described in the embodiment. Next, modifications are described. The following describes the modifications focusing on the differences from the embodiment.

Figure 13:
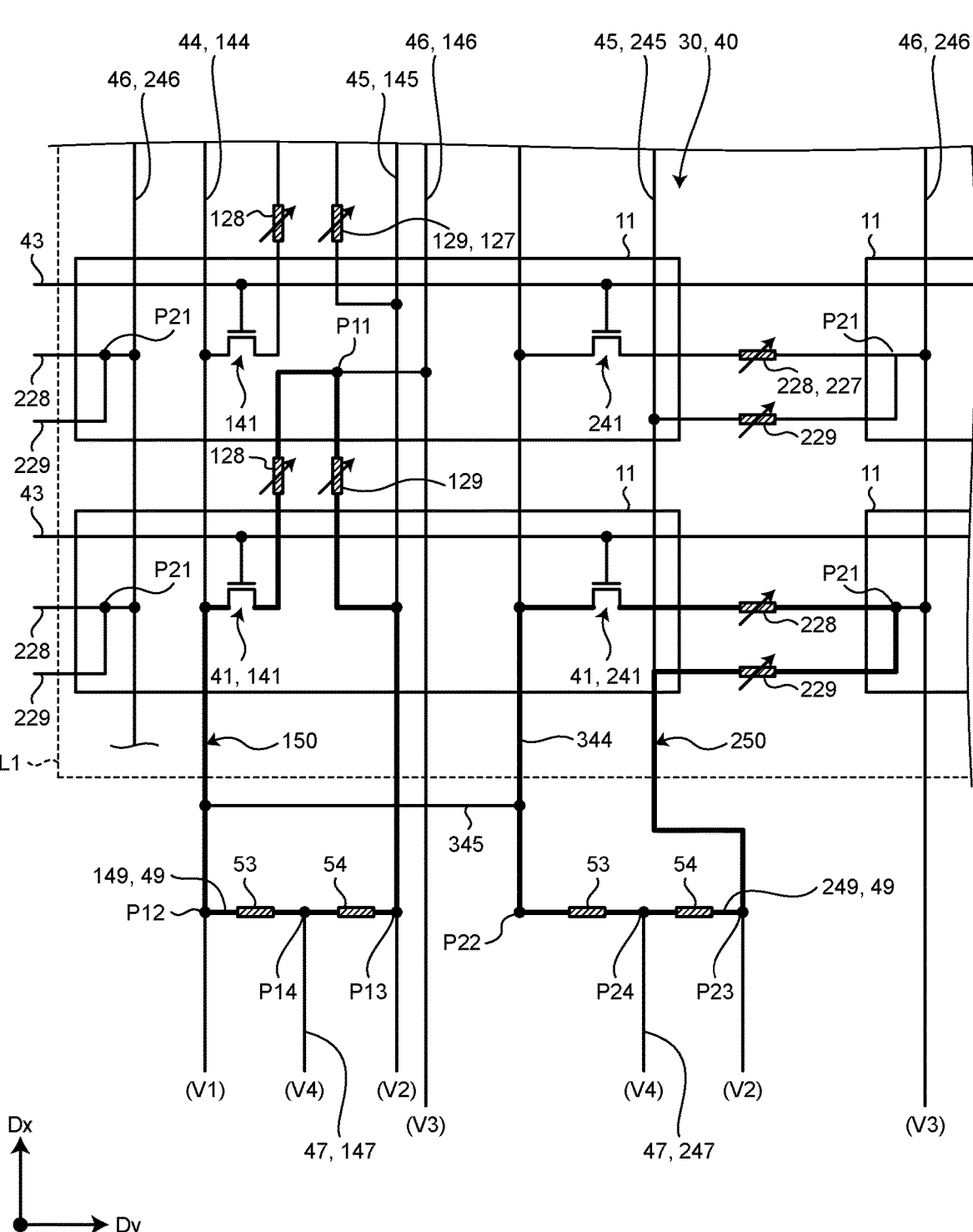
FIG. 13 is a circuit diagram of the wiring layer in the stretchable device according to a modification.

FIG. 13 is a circuit diagram of the wiring layer in the stretchable device according to a modification. The following describes the modification. In the electrical wiring 40 of the stretchable device 1 according to a first modification, the electrical wiring line 240 for lateral strain is different from that according to the embodiment in that it does not include the first potential line 244 for lateral strain. The electrical wiring line 240 for lateral strain is different from that according to the embodiment in that it includes a first link line 344 extending in the first direction Dx instead of the first potential line 244 for lateral strain.

The first link line 344 is disposed over a plurality of bodies 11 and a plurality of longitudinal hinges 12A and extends in the first direction Dx. One end of the first link line 344 is disposed in the peripheral region 3 and is coupled to the coupling line 249 for lateral strain. The first link line 344 is coupled to the source electrode of the transistor 241 for lateral strain. Therefore, the difference between the first link line 344 and the first potential line 244 for lateral strain is as follows: the first link line 344 is not coupled to the first potential line selection circuit 103, but the first potential line 244 for lateral strain is coupled to the first potential line selection circuit 103.

The electrical wiring 40 of the stretchable device 1 according to the modification is different from that according to the embodiment in that it includes a second link line 345. The second link line 345 links the first potential line 144 for longitudinal strain to the first link line 344. With this configuration, the first link line 344 receives the first potential V1 via the second link line 345. Therefore, the first potential line 244 for lateral strain is not required.

The embodiment and the modification describe an example where the strain gauge 27 is provided to each of the longitudinal hinge 12A and the lateral hinge 12B. In the stretchable device according to the present disclosure, the strain gauge 27 may be provided to only one of the longitudinal hinge 12A and the lateral hinge 12B.

What is claimed is:
1. A stretchable device comprising:
a resin base member;
a plurality of strain gauges disposed on the resin base member;
electrical wiring configured to detect an amount of change in resistance of each of the strain gauges; and
a housing that accommodates the resin base member, the strain gauges, and the electrical wiring, wherein
the housing comprises a detection region configured to detect an applied load and a peripheral region having a frame-like shape and surrounding the detection region, when viewed in a direction orthogonal to a planar direction in which the resin base member extends,
the resin base member comprises:
a plurality of bodies disposed in the detection region and separated from one another; and
a plurality of hinges disposed in the detection region and coupling the bodies while meandering,
the strain gauges each comprise:
a first strain gauge extending from a first end of the hinge to a second end of the hinge; and
a second strain gauge extending from the second end of the hinge to the first end of the hinge, a first end of the first strain gauge and a first end of the second strain gauge are coupled to each other at the second end of the hinge, the electrical wiring comprises:

a first potential line disposed over the peripheral region, the bodies, and the hinges and configured to apply a first potential to a second end of the first strain gauge;

a second potential line disposed over the peripheral region, the bodies, and the hinges and configured to apply a second potential lower than the first potential to a second end of the second strain gauge;

a coupling line disposed in the peripheral region and coupling the first potential line to the second potential line;

a first signal line disposed over the peripheral region, the bodies, and the hinges and configured to detect a predetermined potential; and a second signal line disposed in the peripheral region and configured to detect a predetermined potential, the predetermined potential detected by the first signal line is a third potential at a first coupling point at which the first end of the first strain gauge and the first end of the second strain gauge are coupled, the predetermined potential detected by the second signal line is a fourth potential at a midpoint of the coupling line, one of the first strain gauge and the second strain gauge is an inner peripheral strain gauge disposed on an inner periphery of the hinge, the other one of the first strain gauge and the second strain gauge is an outer peripheral strain gauge disposed on an outer periphery of the hinge, and the amount of change in resistance of each strain gauge is detected based on a potential difference between the third potential detected from the first signal line and the fourth potential detected from the second signal line.

2. The stretchable device according to claim 1, further comprising:

a switching element disposed on the body and interposed between the first signal line and the second end of the first strain gauge; and a gate line disposed over the peripheral region, the bodies, and the hinges and configured to cause the switching element to be ON and OFF.

3. The stretchable device according to claim 1, wherein the hinges comprise:

a longitudinal hinge extending in a first direction parallel to the planar direction; and a lateral hinge extending in a second direction parallel to the planar direction and intersecting the first direction, and the strain gauge is disposed on each of the longitudinal hinge and the lateral hinge.

4. The stretchable device according to claim 2, wherein the hinges comprise:

a longitudinal hinge extending in a first direction parallel to the planar direction; and a lateral hinge extending in a second direction parallel to the planar direction and intersecting the first direction, and the strain gauge is disposed on each of the longitudinal hinge and the lateral hinge.

* * * * *